United States Patent
Shimada et al.

(10) Patent No.: US 8,397,680 B2
(45) Date of Patent: Mar. 19, 2013

(54) ENGINE SYSTEM

(75) Inventors: Atsushi Shimada, Hitachinaka (JP); Takao Ishikawa, Hitachi (JP); Masatoshi Sugimasa, Tokai (JP)

(73) Assignee: Hitachi, Ltd., Tokyo (JP)

( * ) Notice: Subject to any disclaimer, the term of this patent is extended or adjusted under 35 U.S.C. 154(b) by 1264 days.

(21) Appl. No.: 12/146,498

(22) Filed: Jun. 26, 2008

(65) Prior Publication Data

US 2009/0000575 A1    Jan. 1, 2009

(30) Foreign Application Priority Data

Jun. 29, 2007 (JP) .................................. 2007-171409

(51) Int. Cl.
- F02B 43/08 (2006.01)
- F01N 3/02 (2006.01)
- B60K 5/00 (2006.01)

(52) U.S. Cl. ........ 123/3; 123/DIG. 12; 60/320; 180/301

(58) Field of Classification Search ........ 123/3, DIG. 12; 180/301; 60/320; 165/146
See application file for complete search history.

(56) References Cited

U.S. PATENT DOCUMENTS

| | | | | |
|---|---|---|---|---|
| 6,609,582 B1 * | 8/2003 | Botti et al. | ............... | 180/65.245 |
| 6,641,795 B2 * | 11/2003 | Abe | ............... | 423/648.1 |
| 6,838,063 B2 * | 1/2005 | Kondo et al. | ............... | 422/209 |
| 6,915,869 B2 * | 7/2005 | Botti et al. | ............... | 180/65.245 |
| 7,089,907 B2 * | 8/2006 | Shinagawa et al. | ............... | 123/295 |
| 7,096,664 B2 * | 8/2006 | Nishimoto et al. | ............... | 60/302 |
| 7,111,452 B2 * | 9/2006 | Miyoshi et al. | ............... | 60/285 |
| 7,131,264 B2 * | 11/2006 | Weissman et al. | ............... | 60/286 |
| 7,178,616 B2 * | 2/2007 | Botti et al. | ............... | 180/65.1 |
| 7,192,667 B2 * | 3/2007 | Yang et al. | ............... | 429/429 |
| 7,273,120 B2 * | 9/2007 | Tabata | ............... | 180/65.265 |
| 7,434,547 B2 * | 10/2008 | Clawson | ............... | 123/3 |
| 7,448,348 B2 * | 11/2008 | Shinagawa et al. | ............... | 123/3 |

(Continued)

FOREIGN PATENT DOCUMENTS

| | | |
|---|---|---|
| JP | 2000-303836 | 10/2000 |
| JP | 2002-058111 | 2/2002 |

(Continued)

OTHER PUBLICATIONS

Japanese Office Action of Appln. No. 2007-171409 with translation dated Jun. 2, 2009.

(Continued)

*Primary Examiner* — Rinaldi Rada
*Assistant Examiner* — Tea Holbrook
(74) *Attorney, Agent, or Firm* — Antonelli, Terry, Stout & Kraus, LLP.

(57) ABSTRACT

An engine system includes a medium which chemically repeats storage and release of hydrogen to provide an engine system where CO2 emissions can be suppressed and system efficiency is excellent. The engine system includes a hydrogen supply device for producing hydrogen rich gas from a medium which chemically repeats the storage and release of hydrogen, and drives an engine using the hydrogen rich gas produced in the hydrogen supply device as one of the fuels. This engine system is characterized by comprising a waste heat supply device for supplying waste heat of the engine to hydrogen supply device, a generator which generates electricity by power of the engine, an energy storage device for storing electric power produced by the generator, and a motor for converting electric power discharged from the energy storage device into power.

12 Claims, 7 Drawing Sheets

U.S. PATENT DOCUMENTS

| | | | |
|---|---|---|---|
| 7,765,961 B2* | 8/2010 | Rutledge | 123/3 |
| 8,003,270 B2* | 8/2011 | Baird et al. | 429/433 |
| 2005/0115226 A1* | 6/2005 | Benz et al. | 60/287 |
| 2005/0224042 A1* | 10/2005 | Shinagawa et al. | 123/295 |
| 2006/0113129 A1* | 6/2006 | Tabata | 180/65.2 |
| 2006/0204799 A1* | 9/2006 | Ishikawa et al. | 429/19 |
| 2006/0260562 A1* | 11/2006 | Otterstrom et al. | 123/3 |
| 2008/0041034 A1* | 2/2008 | Hosoi | 60/276 |

FOREIGN PATENT DOCUMENTS

| | | |
|---|---|---|
| JP | 2005-147124 | 6/2005 |
| JP | 2005-299500 | 10/2005 |
| JP | 2006-118488 | 5/2006 |
| JP | 2006-257906 | 9/2006 |

OTHER PUBLICATIONS

U.S. Appl. No. 11/971,296.

Japanese Office Action of Appln. No. 2007-171409 dated Oct. 20, 2009 with English translation.

* cited by examiner

----▶ FUEL PIPE LINE

ENGINE SYSTEM

CLAIM OF PRIORITY

The present application claims priority from Japanese Patent Application JP 2007-171409 filed on Jun. 29, 2007, the content of which is hereby incorporated by reference into this application.

FIELD OF THE INVENTION

The present invention relates to a hydrogen fueled engine system in which a medium for chemically repeating storage and release of hydrogen is mounted and hydrogen rich gas produced from the medium is used as a fuel.

BACKGROUND OF THE INVENTION

It is necessary to supply heat to a hydrogen supply device for producing hydrogen rich gas in a system where a medium for chemically repeating the storage and release of hydrogen is mounted; a hydrogen supply device is provided for producing hydrogen rich gas from the medium; and the hydrogen rich gas produced in the hydrogen supply device is supplied to an internal combustion engine. The system becomes highly effective when waste heat from the engine is utilized for the heat to produce hydrogen rich gas since new energy is not needed to supply to the hydrogen supply device. However, a system for managing the waste engine heat supplied to the hydrogen supply device is necessary because an amount of the waste engine heat changes depending on the driving point of the engine.

As a conventional system for managing heat and power, JP-A-2000-303836, for instance, describes a system where an engine, a reformer and a fuel cell are included and manages heat by switching a heat supply method between during start-up and after warm-up. It also describes a system which combines systems for managing the heat and for managing power utilizing the load-efficiency characteristics of the engine and the fuel cell.

A system described in JP-A-2000-303836 is a hybrid system, power sources of which are an engine using a medium as a fuel and a fuel cell to generate electricity using fuel gas containing hydrogen reformed from a medium in the reformer and oxygen gas. Since the fuel supplied to the engine is the medium in this hybrid system, it is difficult to suppress $CO_2$ emissions. On the other hand, in a system where hydrogen rich gas produced in the hydrogen supply device is supplied to the engine, it is possible to suppress $CO_2$ emissions and to make the system environmentally superior. However, in the system where hydrogen rich gas produced in the hydrogen supply device is supplied to the engine, it is necessary to manage both the waste heat and the efficiency of the engine because the fuel to be supplied to the engine is reformed from the medium by using the waste heat of the engine. Moreover, in order to make the whole system highly efficient, the system needs to manage a driving point of the engine to be in a region of high thermal efficiency, combining a motor, an energy storage device and an engine.

An object of the present invention is, in an engine system including a medium which chemically repeats the storage and release of hydrogen, to provide an engine system where $CO_2$ emissions can be suppressed and system efficiency is excellent.

SUMMARY OF THE INVENTION

An engine system comprises a hydrogen supply device for producing hydrogen rich gas from a medium which chemically repeats the storage and release of hydrogen, and drives an engine using hydrogen rich gas produced in the hydrogen supply device as one of fuels. Additionally, the system comprises a waste heat supply device for supplying the waste heat from the engine to the hydrogen supply device, a generator which generates electricity by using power of the engine, an energy storage device for storing electricity produced by the generator, and a motor for converting electric power supplied from the energy storage device into mechanical power. In this engine system, electric power is generated by engine power, stored in an energy storage device, discharged from the energy storage device according to a requirement by a user, and converted to power by the motor, thereby the motor follows the user's requirement. Therefore, the engine does not need to be driven to completely follow the user's requirement; heat supply rate of waste engine heat which is supplied to the hydrogen supply device is high; and the engine can be driven in a region of high driving efficiency. As a result, the engine system has characteristics that consumption rate of the medium is low and its efficiency is high.

According to the present invention, an engine system is provided in which $CO_2$ emissions can be suppressed, the consumption rate of the medium is low, and the system efficiency is high since power can be generated by using the hydrogen rich gas produced from the hydrogen supply device.

DETAILED DESCRIPTION OF THE PREFERRED EMBODIMENTS

Figure 1:
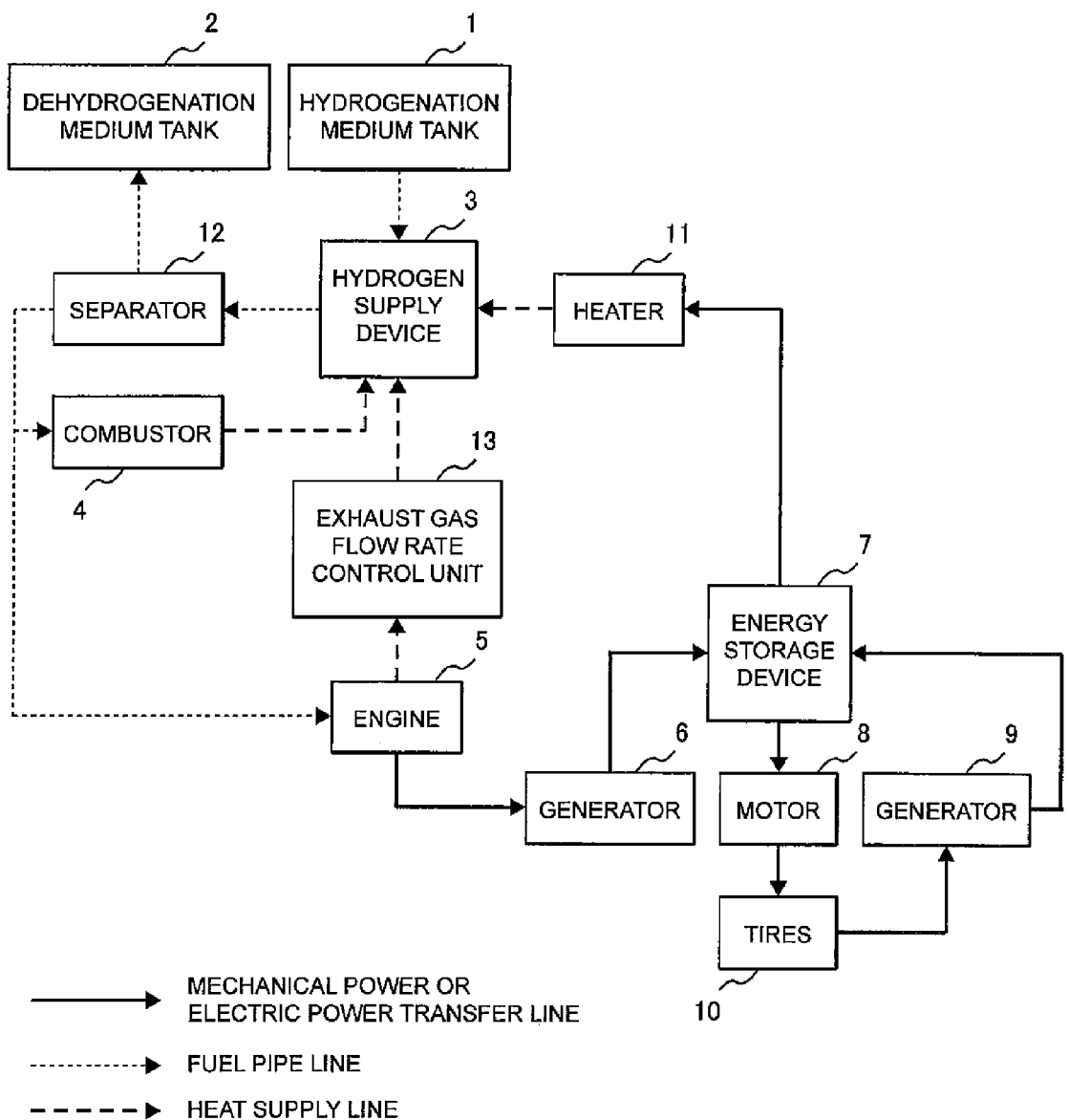
FIG. 1 is a block diagram of the whole system.

Hereinafter, embodiments of the present invention will be described referring to the drawings.

FIG. 1 is a block diagram of the whole system. A medium which chemically stores hydrogen (hereinafter, hydrogenation medium) is provided in a hydrogenation medium tank 1 and the hydrogenation medium is supplied to a hydrogen supply device 3. A medium stored in a dehydrogenation medium tank 2 (hereinafter, dehydrogenation medium) is a fuel after the hydrogenation medium has discharged hydrogen in the hydrogen supply device 3. The hydrogenation medium is, for instance, a hydrocarbon fuel such as decalin, cyclohexane or methylcyclohexane, or a fuel mixture thereof. The dehydrogenation medium is, for instance, a hydrocarbon fuel such as naphthalene, benzene or toluene, or a fuel mixture thereof. A case of using methylcyclohexane as the hydrogenation medium will be described below.

In the hydrogen supply device 3, a following reaction is carried out.

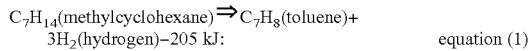
$$C_7H_{14}(\text{methylcyclohexane}) \Rightarrow C_7H_8(\text{toluene}) + 3H_2(\text{hydrogen}) - 205\ kJ: \quad \text{equation (1)}$$

The toluene and hydrogen produced according to the equation (1) are separated respectively by a separator 12; the hydrogen is supplied to an internal combustion engine 5; and the toluene is collected in the dehydrogenation medium tank 2. The hydrogen supplied to the engine 5 may be mixed with the toluene or the methylcyclohexane, and hence it is hereinafter called hydrogen rich gas. According to the equation (1), heat quantity of about 68 kJ/mol is required in order to produce 1 mol of hydrogen from methylcyclohexane. Therefore, the system is configured for exhaust gas from the engine 5 to be supplied to the hydrogen supply device 3. In order to control the reaction temperature in a prescribed range (250 to 400° C.), an exhaust gas flow rate control unit 13 controls a gas flow rate of exhaust gas from the engine 5 which is supplied to the hydrogen supply device 3. The engine 5 is connected to a generator 6, and electric power generated by the generator 6 is stored into an energy storage device 7. The energy storage device 7 includes an electric power conversion device. The electric power is discharged from the energy storage device 7 to a motor 8 and the motor 8 feeds power to tires 10. Moreover, during deceleration of the tires 10, regenerative energy is produced by a generator 9 and stored into the energy storage device 7. When the hydrogen supply device 3 does not have sufficient heat quantity required for the reaction in the equation (1), the heat quantity is supplied from a combustor 4 or from a heater 11 powered by energy storage device 7. The electric power may be supplied to the heater 11 and the motor 8 by utilizing power conversion without storing electric power in the energy storage device 7. Hydrogen rich gas is supplied to the combustor 4, but instead of it, the dehydrogenation medium may be supplied thereto as necessary. As in FIG. 1, the configuration is as follows; the hydrogenation medium which is a liquid fuel is used as a storage fuel; hydrogen rich gas is produced in the hydrogen supply device 3 during power generation and supplied to the engine 5 which generates power. The system stores a liquid fuel with high-quality properties of safety, convenience and energy density and generates power without exhausting $CO_2$.

Figure 2:
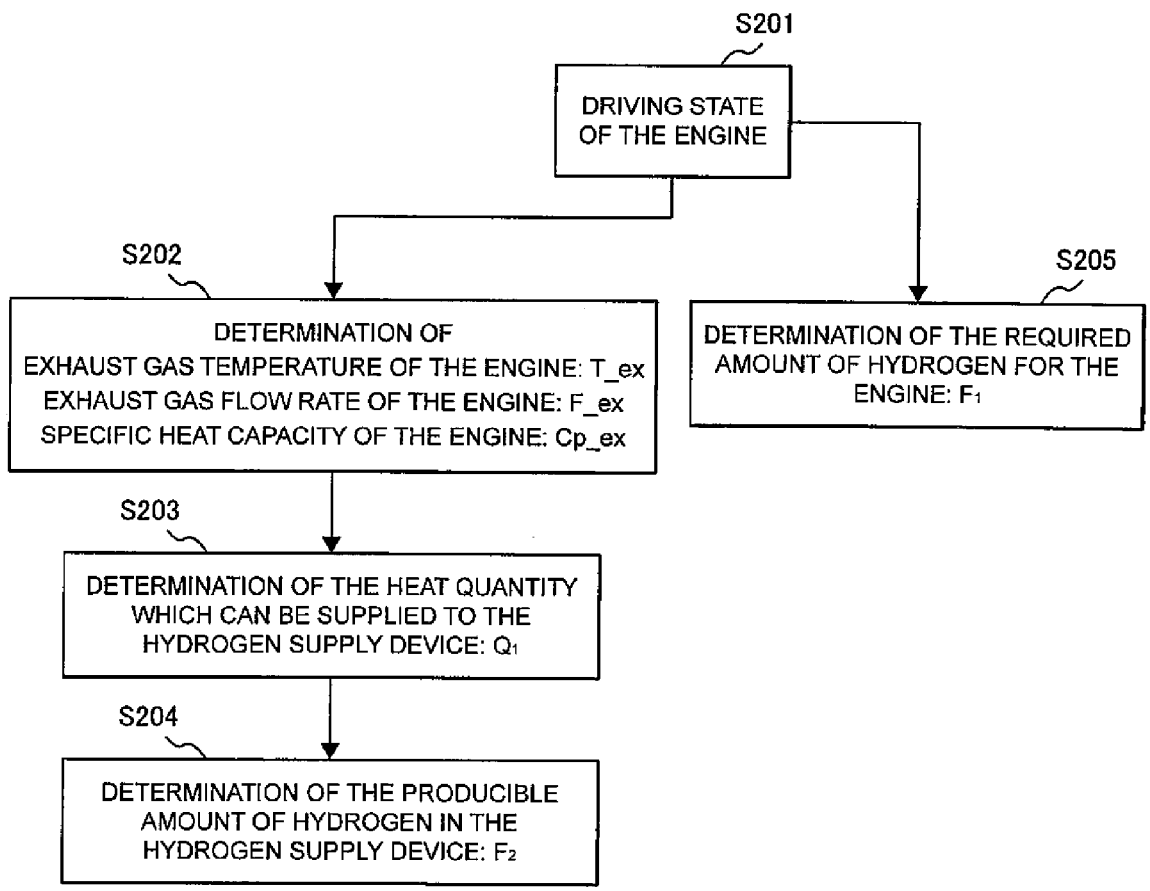
FIG. 2 is a block diagram showing a way to decide a relationship between the driving state of the engine and the producible amount of hydrogen in the hydrogen supply device.

FIG. 2 shows a way to decide a relationship between the engine 5 and the producible amount of hydrogen in the hydrogen supply device 3.

The engine speed and the engine torque, which are the driving state of the engine 5, are determined in S201. Then the exhaust gas temperature T_ex, the flow rate of the exhaust gas F_ex, and the specific heat capacity of the exhaust gas Cp_ex are determined in S202. When the lowest temperature in the reaction in the equation (1) is T_re and the heat recovery efficiency is η_re, the heat quantity $Q_1$ which can be supplied to the hydrogen supply device 3 is determined in S203 as follows.

$$Q_1 = F\_ex \cdot Cp\_ex \cdot (T\_ex - T\_re) \cdot \eta\_re \quad \text{equation (2)}$$

When $Q_1$ is determined, as the required heat quantity is 68 kJ for producing 1 mol of hydrogen according to the equation (1), the producible amount of hydrogen $F_2$ in the hydrogen supply device 3 is determined in S204. On the other hand, when the driving state of the engine 5 is determined in S201, the thermal efficiency of the engine is determined and the required amount of hydrogen $F_1$ for the engine 5 is also determined in S205. To improve the fuel consumption in the configuration of FIG. 1, it is necessary to decrease the consumption rate of the medium. Below values should be considered for that.

$F_1 - F_2$ $Pe/(F_1 \cdot L_{H2})$

Pe is the output of engine 5. $L_{H2}$ is a lower heating value of hydrogen.

When $F_1 - F_2$ is not greater than 0, the heat quantity required for the hydrogen supply device 3 can be supplied only by the heat of the exhaust gas. This means that, when $F_1 - F_2$ is not greater than 0, the consumption rate of the hydrogenation medium depends only on $Pe/(F_1 \cdot L_{H2})$. On the other hand, when $F_1 - F_2$ is greater than 0, it is necessary to supply the heat quantity to the hydrogen supply device 3 from the combustor 4 or the heater 11 in FIG. 1 in addition to the one from the exhaust gas. The heat quantity supplied from the combustor 4 or the heater 11 increases as the $F_1 - F_2$ increases. If the heat quantity is great, the consumption rate of the medium becomes greater, worsening the fuel consumption. Therefore, it is desirable that $F_1 - F_2$ is not greater than 0. When $F_1 - F_2$ is greater than 0, the consumption rate of the hydrogenation medium is influenced by both $F_1 - F_2$ and $Pe/(F_1 \cdot L_{H2})$. Therefore the consumption rate of the hydrogenation medium can be decreased by making $Pe/(F_1 \cdot L_{H2})$ greater when $F_1 - F_2$ is not greater than 0, and by making $Pe/(F_1 \cdot L_{H2})$ greater and $F_1 - F_2$ smaller when $F_1 - F_2$ is greater than 0.

Figure 3:
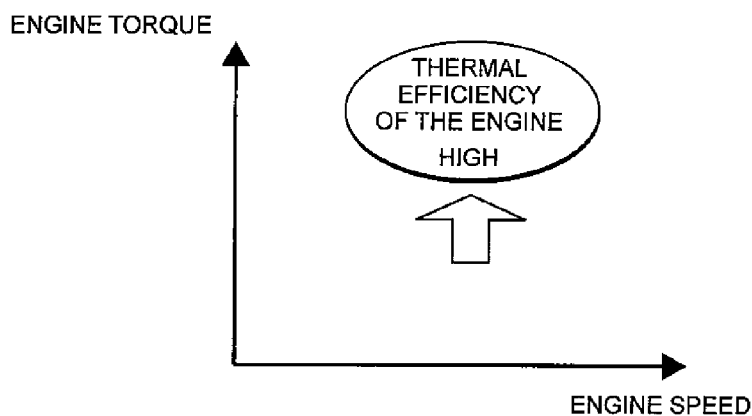
FIG. 3 shows a relationship between the driving conditions and the thermal efficiency of the engine.
Figure 4:
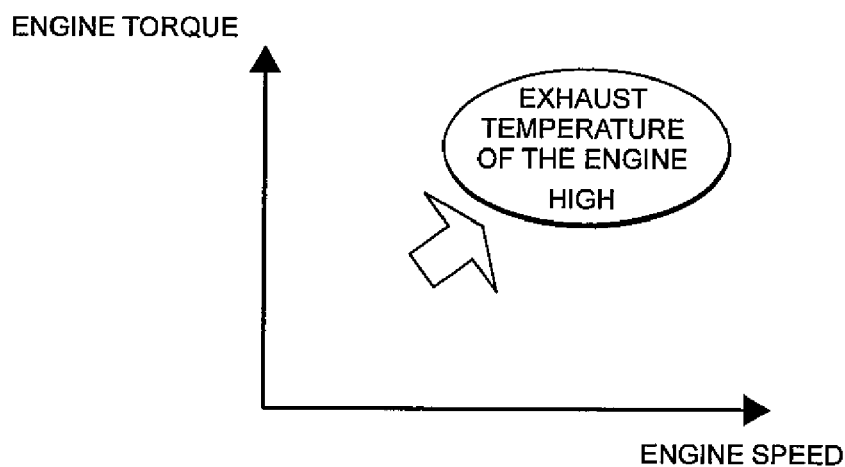
FIG. 4 shows a relationship between the driving conditions and the exhaust gas temperature of the engine.
Figure 5:
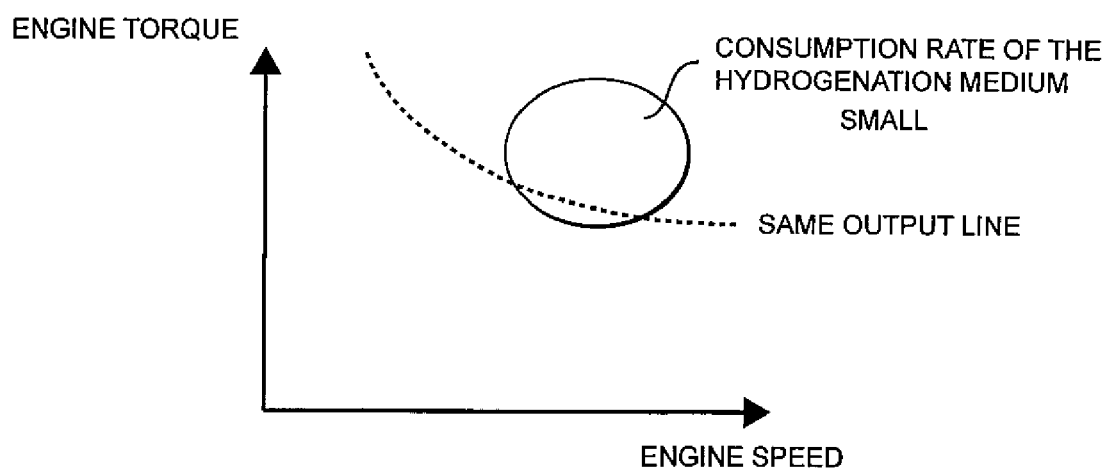
FIG. 5 shows a relationship between the driving conditions of the engine and the consumption rate of the hydrogenation medium.

FIG. 3 shows a relationship between the driving conditions of the engine 5 and thermal efficiency of the engine 5. Generally, in a case of a spark ignition engine, the thermal efficiency of the engine is high in the region of high engine torque. When the thermal efficiency of the engine is high, $Pe/(F_1 \cdot L_{H2})$ becomes higher and the consumption rate of the medium becomes smaller. FIG. 4 is a relationship between the driving conditions of the engine 5 and the engine exhaust gas temperature at a predetermined position of an exhaust pipe. The exhaust gas temperature of the engine 5 becomes high as the output of the engine becomes great. The higher the exhaust gas temperature of the engine 5 is, the greater the $Q_1$ in equation (2) and $F_2$ are. Therefore, $F_1 - F_2$ becomes smaller and the consumption rate of the medium becomes smaller. FIG. 5 shows a region where the consumption rate of the hydrogenation medium is small when an engine having the characteristics in FIG. 3 and FIG. 4 is used for the engine 5 in the configuration of FIG. 1. When the driving point of the engine 5 is determined like this, the consumption rate of the hydrogenation medium is determined. Since the thermal supply rate from the engine 5 to the hydrogen supply device 3 affects the consumption rate map of the hydrogenation medium in this system, the thermal efficiency of the engine 5 and the consumption rate of the hydrogenation medium do not necessarily agree with each other.

Figure 6:
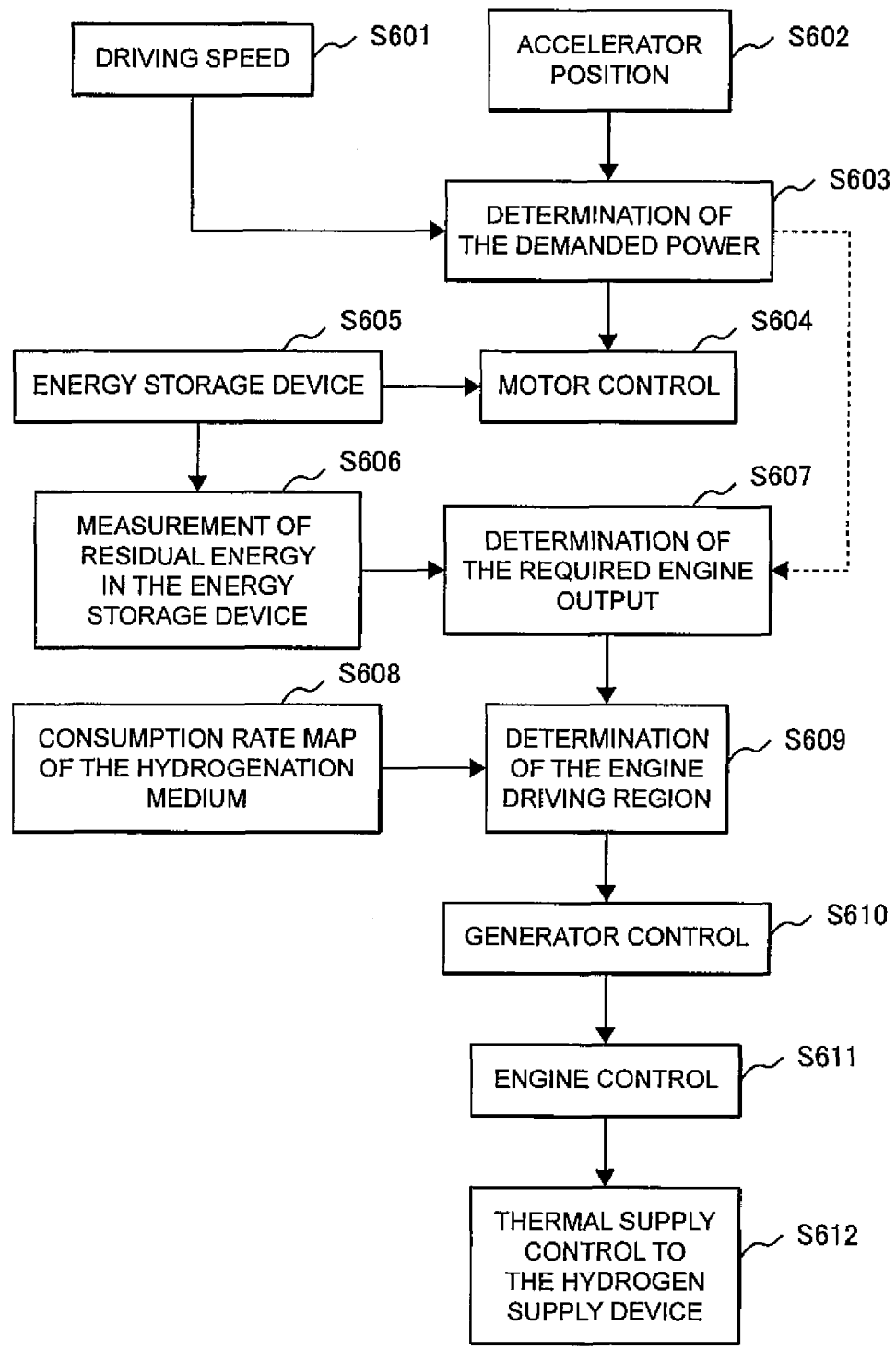
FIG. 6 is a flowchart showing a method for driving the whole system.

FIG. 6 is a flowchart showing a method for driving the whole system. According to a car speed in S601 and an accelerator position in S602, power demanded by a user is determined in S603. After that, the motor is controlled in S604 using electric power output from the energy storage device in S605. Residual energy in the energy storage device is measured in S606 and the required engine output is determined in S607 so as to make the residual energy fall into the predetermined range. Or the required engine output may be determined according to the demanded power in S603. According to the required engine output and the consumption rate map of the hydrogenation medium in S608, the engine speed and the engine torque are determined in S609 so that the consumption rate of the hydrogenation medium becomes smallest on the same engine-output line shown in FIG. 5. The generator 6 and the engine 5 are controlled in S610 and S611, respectively, so as to make the engine speed and the engine torque equal to the determined values in S609. After that, thermal supply control to the hydrogen supply device 3 is carried out in S612.

Figure 7:
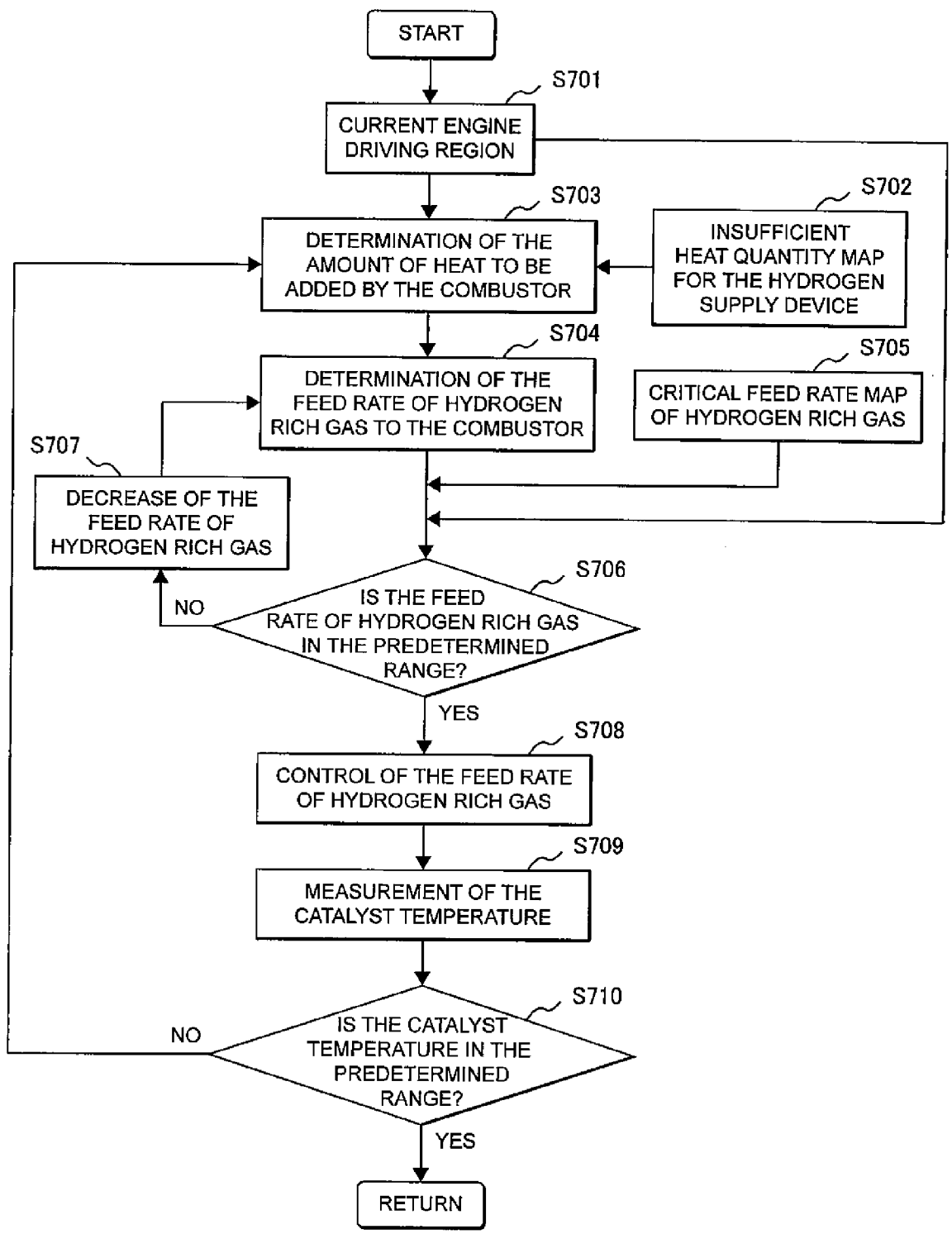
FIG. 7 shows a method for controlling thermal supply to the hydrogen supply device by the combustor.

FIG. 7 shows a method for controlling thermal supply to the hydrogen supply device 3 by the combustor 4. From the current driving point of the engine 5 in S701 and the insufficient heat quantity map of the hydrogen supply device 3 in S702, the amount of heat to be added by the combustor 4 is determined in S703; the feed rate of hydrogen rich gas to the combustor 4 is determined in S704 and then hydrogen rich gas is supplied to the combustor 4. According to the critical feed rate map of the hydrogen rich gas in S705 and the current engine driving region in S701, it is determined in S706 whether the feed rate of the hydrogen rich gas is within the predetermined range. The critical feed rate map of the hydrogen rich gas in S705 is determined by oxygen concentration in the engine exhaust gas. The oxygen concentration in the engine exhaust gas is determined by the mixture ratio of fuel and air supplied to the engine. Therefore, when the driving region of the engine is determined, the critical feed rate of the hydrogen rich gas is determined. When the hydrogen rich gas is supplied beyond the critical point, it should be decreased in S707. After that, catalyst temperature is sensed by a catalyst temperature-measuring device or a catalyst temperature-estimating device in S709. The catalyst temperature is checked to be within the predetermined range in S710. If it is out of the predetermined range, the amount of heat to be added by the combustor 4 is controlled in S703 to make the catalyst temperature within the predetermined range. In the aforementioned thermal supply controlling method, the heater 11 may be used for the thermal supply instead of the combustor 4.

Figure 8:
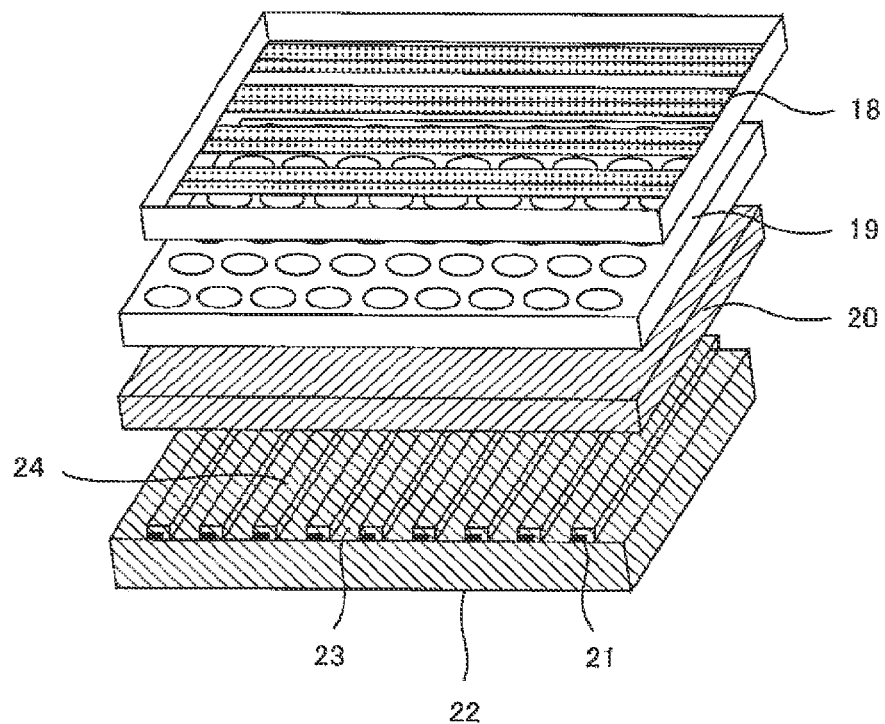
FIG. 8 shows a configuration of the hydrogen supply device.

The configuration of the hydrogen supply device 3 shown in FIG. 1 will be explained referring to FIG. 8. As described in FIG. 8, the basic configuration of the hydrogen supply device 3 is as follows; a catalyst layer 24 composed of Pt/alumina catalyst is produced over a high thermal conductivity substrate 22 of pure aluminum (thermal conductivity is 250 W/mK) where fluid channel walls 21 are provided. A hydrogen separation film 20 which selectively passes hydrogen is layered over the catalyst layer 24; hydrogen passages 18 are stacked over a spacer 19 which lies between the hydrogen separation film 20 and hydrogen passages 18. The hydrogen supply device 3 is provided in an engine exhaust pipe.

The hydrogenation medium supplied to the hydrogen supply device 3 passes through the fuel passages 23, contacting with the catalyst layer 24 produced over the surface of the high thermal conduction substrate 22, which proceeds with the dehydrogenation reaction and produces hydrogen. The produced hydrogen passes the hydrogen separation film 20, the spacer 19 and the hydrogen passages 18, and is exhausted from the hydrogen supply device 3. The hydrogen which did not pass the hydrogen separation film 20 and the dehydrogenation medium are exhausted through the fuel passages 23 to outside of the hydrogen supply device 3. The hydrogen and dehydrogenation medium exhausted through the fuel passages 23 are mixed with hydrogen exhausted from the hydrogen passages 18 and supplied to the separator 12 in FIG. 1. A configuration may be allowed in which the hydrogen exhausted from the hydrogen passages 18 is supplied between the separator 12 and the engine 5 without being mixed with the hydrogen and dehydrogenation medium exhausted from the fuel passages 23. Moreover, although a hydrogen separation film 20 is provided in the configuration of FIG. 8 for efficient dehydrogenation reaction from the hydrogenation medium at low temperatures, a configuration may be allowed in which the hydrogen separation film 20 is not provided. Furthermore, the basic structure shown in FIG. 8 may be accumulated.

Figure 9:
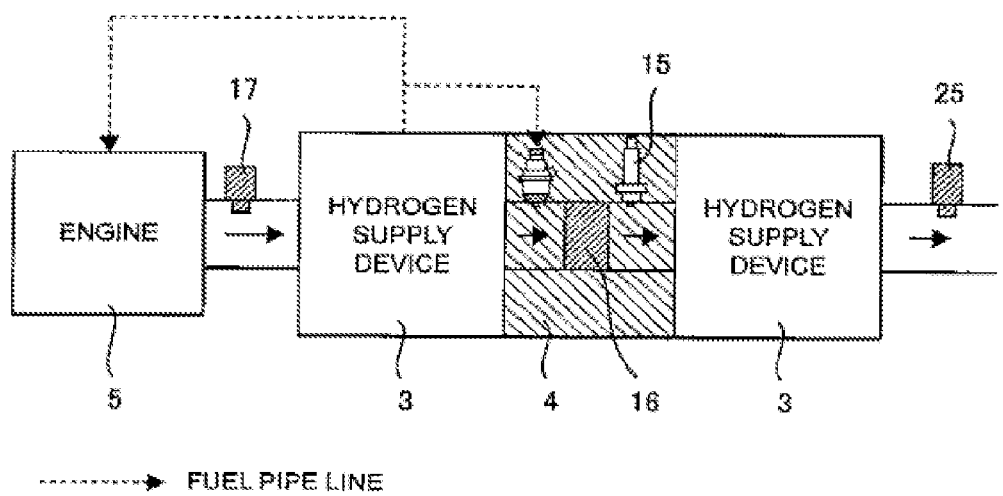
FIG. 9 shows a configuration of the combustor.

FIG. 9 shows a configuration of the combustor 4. In this configuration, the exhaust gas of the engine 5 is supplied to the hydrogen supply device 3, causing a temperature distribution along the direction of exhaust gas flow in the hydrogen supply device 3. Under some driving conditions of the engine 5, catalyst temperature is high enough to produce hydrogen at the upstream side of the exhaust gas in the hydrogen supply device 3, but at the downstream side of the exhaust gas in the hydrogen supply device 3 a region appears where the catalyst temperature is low and hydrogen can not be produced. In this case, the hydrogen supply devices 3 are provided on the upstream side and the downstream side of the exhaust gas of the combustor 4 as shown in FIG. 9. The hydrogen rich gas produced in the hydrogen supply devices 3 on the upstream side is supplied to the exhaust pipe on the downstream side by using the hydrogen supply device 3. Accordingly, insufficient heat in the hydrogen supply device 3 on the downstream side can be compensated by heat supplied to the hydrogen supply device 3 on the upstream side.

After the exhaust gas and hydrogen rich gas are mixed by a mixer 16, oxygen in the exhaust gas and the hydrogen rich gas are burnt by an ignition system 15. They may be burnt by using a catalyst instead of the ignition system 15. The mixer 16 includes a blade-shaped structure for imparting rotation to the flow or a structure with projections and/or restrictors for mixing, and mixes the exhaust gas and the hydrogen rich gas using the above structure in it. According to this system, since oxygen in the exhaust gas has a higher temperature than that in the outside air, the amount of the hydrogen rich gas required to raise the temperature up to the predetermined combustion gas temperature is small, and the thermal efficiency of the combustor 4 becomes higher. Moreover, compared with a case of using oxygen in the outside air, the number of newly required components such as pumps is smaller, thereby the system is low cost and simple.

In order to burn the hydrogen rich gas with oxygen in the exhaust gas, lean combustion is required in the engine 5. Oxygen concentration in air during the lean combustion is sensed by oxygen concentration sensors 17 and 25. The amount of the oxygen supplied to the combustor 4 is made less than that of hydrogen rich gas for complete burning by monitoring the oxygen concentration sensed by the oxygen concentration sensor 17. Or, in a case of using the oxygen concentration sensor 25, the amount of the hydrogen rich gas supplied to the combustor 4 is controlled to be more than that of the predetermined oxygen concentration.

Figure 10:
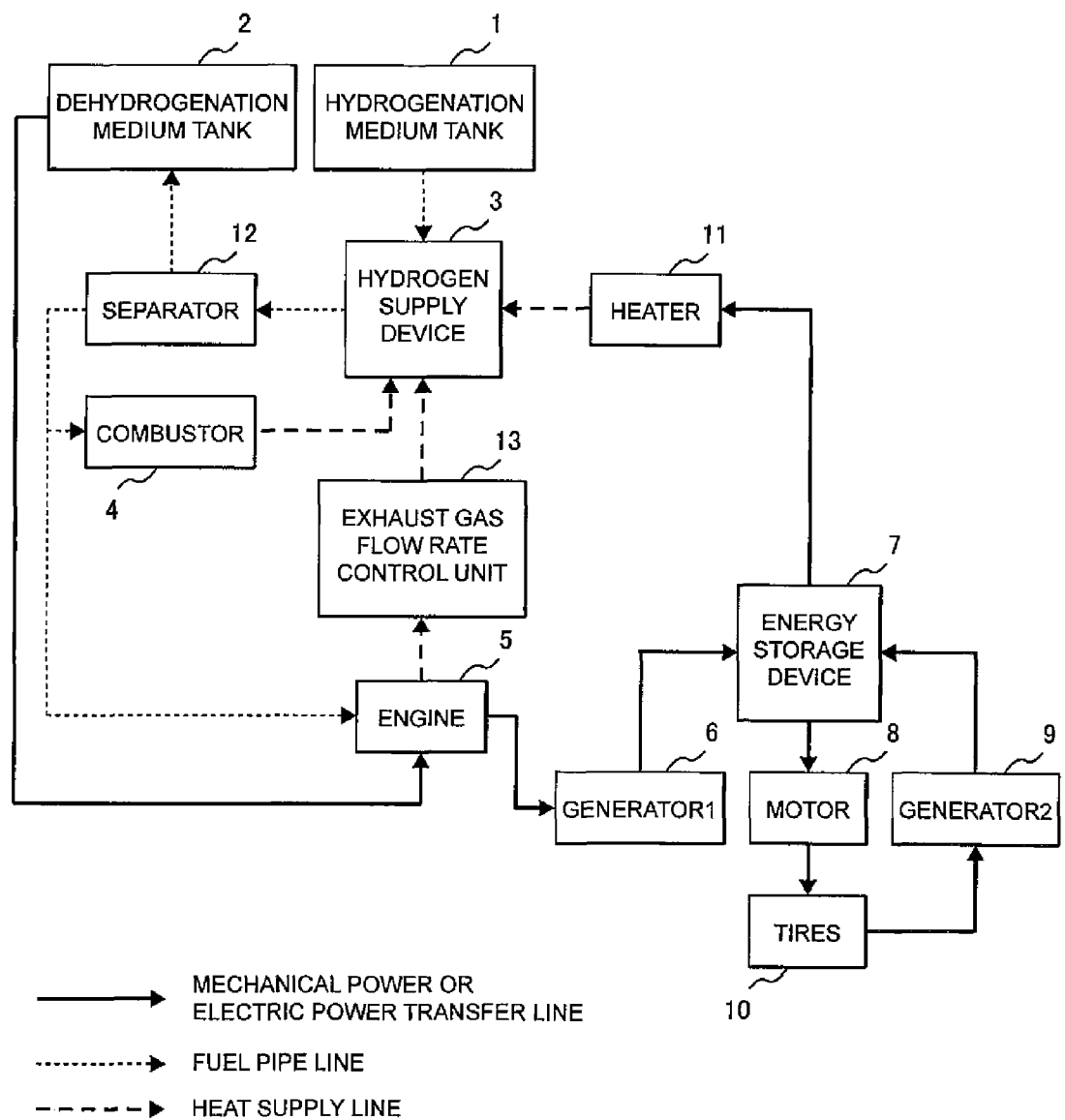
FIG. 10 is a block diagram of the whole system to supply the dehydrogenation medium to the engine.

FIG. 10 shows a system configuration for supplying the dehydrogenation medium to the engine 5.

When the catalyst temperature in the hydrogen supply device 3 is low or the energy storage rate of the energy storage device 7 is low as in the starting of the engine 5, it is difficult both to produce the amount of the hydrogen rich gas required for the engine 5 and to produce power required for the motor 8. In this case, the dehydrogenation medium is supplied from the dehydrogenation medium tank 2 to the engine 5. At this time, both the hydrogen rich gas and the dehydrogenation medium or only the dehydrogenation medium may be supplied to the engine 5. If the dehydrogenation medium is insufficient, the hydrogenation medium may be supplied to the engine 5. When methylcyclohexane is used for the hydrogenation medium, the dehydrogenation medium is toluene and the octane number is equal to or more than that of gasoline. Therefore, it is possible to drive using the engine 5.

Moreover, the above configuration makes it possible to drive with a higher output of engine 5 compared to the case of supplying only hydrogen rich gas. Furthermore, it has a feature that when the storage in the hydrogenation medium tank 1 is exhausted, the dehydrogenation medium can be supplied to the engine 5.

It is also possible that the dehydrogenation medium is not supplied to the engine 5 but supplied to the combustor 4 for heat supply to the hydrogen supply device 3.

What is claimed is:

1. An engine system, which comprises:
    first and second hydrogen supply devices for producing hydrogen rich gas from a medium which chemically repeats storage and release of hydrogen, and drives an engine by using hydrogen rich gas produced in the first and second hydrogen supply devices for fuel;
    a waste heat supply device for supplying waste heat from the engine to the first and second hydrogen supply devices;
    a generator which generates electricity by using power from the engine;
    an energy storage device for storing electric power produced by the generator;
    a motor for converting electric power supplied from the energy storage device into mechanical power; and
    a combustor installed in an exhaust pipe of the engine, the combustor burning the hydrogen rich gas produced by the medium or the first hydrogen supply device,
    wherein the first hydrogen supply device is provided on the upstream side of the exhaust pipe with respect to a position where the combustor is installed, the second hydrogen supply device is provided on the downstream side of the exhaust pipe with respect to a position where the combustor is installed, and heat from the combustor is supplied to at least the second hydrogen supply device.

2. The engine system according to claim 1,
    wherein the electric power supplied from the energy storage device to the motor is controlled with a control device according to demanded power required by a user, and
    wherein the control device determines engine power according to residual energy of the energy storage device or the demanded power to control engine speed and engine torque.

3. The engine system according to claim 2,
    wherein the control device controls the engine speed and the engine torque based on the engine power and consumption rate of the medium determined by the demanded power.

4. The engine system according to claim 1,
    wherein the waste heat supply device includes a waste heat control device for controlling heat quantity generated by the engine.

5. The engine system according to claim 4, comprising a catalyst temperature estimation device for estimating or sensing catalyst temperature of the hydrogen supply devices,
    wherein the waste heat control device controls the quantity of waste heat according to the catalyst temperature.

6. The engine system according to claim 5,
    wherein the medium is supplied to the engine when the catalyst temperature of the hydrogen supply devices is not greater than a prescribed value and the amount stored in the energy storage device is not greater than a prescribed value.

7. The engine system according to claim 4, comprising a catalyst temperature estimation device for estimating or sensing catalyst temperature of the hydrogen supply devices,
    wherein the combustor, or the waste heat control device is controlled according to driving state of the engine and the catalyst temperature.

8. The engine system according to claim 1,
    wherein combustor includes a hydrogen rich gas supply device for supplying the hydrogen rich gas into exhaust gas and an ignition system for igniting mixture gas of the exhaust gas and the hydrogen rich gas.

9. The engine system according to claim 8, comprising at least one selected from an oxygen concentration sensor for sensing the oxygen concentration of the exhaust gas between the combustor and the engine and an oxygen concentration sensor for sensing the oxygen concentration of the exhaust gas on the downstream side of the combustor.

10. The engine system according to claim 9,
    wherein feed rate of the hydrogen rich gas to be supplied to the combustor or the medium is controlled according to an output value of the oxygen concentration sensor.

11. The engine system according to claim 1, comprising an oxygen concentration sensor for sensing oxygen concentration of the exhaust gas on the upstream side of the exhaust pipe,
    wherein use of the combustor is prohibited when the oxygen concentration is not greater than a prescribed value.

12. The engine system according to claim 1,
    wherein the hydrogen produced in the hydrogen supply devices on the upstream side of the exhaust pipe is supplied to the combustion device.

* * * * *